(12) United States Patent
Leber et al.

(10) Patent No.: US 11,103,910 B1
(45) Date of Patent: Aug. 31, 2021

(54) CONDUIT OFFSET BENDER

(71) Applicant: TEMCo Industrial, LLC, Fremont, CA (US)

(72) Inventors: Josh Leber, Fremont, CA (US); Justin Harvey, Fremont, CA (US)

(73) Assignee: TEMCO INDUSTRIAL, LLC, Fremont, CA (US)

( * ) Notice: Subject to any disclaimer, the term of this patent is extended or adjusted under 35 U.S.C. 154(b) by 74 days.

(21) Appl. No.: 16/709,963

(22) Filed: Dec. 11, 2019

(51) Int. Cl.
| | |
|---|---|
| *B21D 7/06* | (2006.01) |
| *B21D 7/14* | (2006.01) |
| *B21D 7/024* | (2006.01) |
| *B21D 11/18* | (2006.01) |
| *B21D 7/022* | (2006.01) |
| *B21D 7/02* | (2006.01) |

(52) U.S. Cl.
CPC ............ *B21D 7/063* (2013.01); *B21D 7/024* (2013.01); *B21D 7/14* (2013.01); *B21D 7/021* (2013.01); *B21D 7/022* (2013.01); *B21D 11/18* (2013.01)

(58) Field of Classification Search
CPC . B21D 7/00; B21D 7/02; B21D 7/021; B21D 7/022; B21D 7/0225; B21D 7/024; B21D 7/03; B21D 7/04; B21D 7/14; B21D 7/06; B21D 7/063; B21D 7/08; B21D 7/085; B21D 11/18
USPC ......................................................... 72/459
See application file for complete search history.

(56) References Cited

U.S. PATENT DOCUMENTS

| | | | | | |
|---|---|---|---|---|---|
| 3,023,650 | A | * | 3/1962 | Sall ........................ | B21D 11/18 72/409.09 |
| 3,128,654 | A | * | 4/1964 | Herrstrum ................ | B21D 7/06 72/452.2 |
| 6,487,889 | B1 | * | 12/2002 | Bates ..................... | B21D 7/063 72/459 |
| 7,234,338 | B2 | * | 6/2007 | Mirtz ..................... | B21D 7/021 72/459 |
| 2003/0213279 | A1 | * | 11/2003 | Henden .................. | B21D 11/18 72/383 |

(Continued)

OTHER PUBLICATIONS

1810 & 1811 Little Kicker Hand Bender Instruction Manual. Datasheet [online]. Greenlee Textron Inc., 2014 [retrieved on Apr. 15, 2021]. Retrieved from the Internet. <URL: https://cdn.greenlee.com/resources/media?key=09eb2b48-1f1f-4317-b9b7-b0eaa947bf42&languageCode=en&type=document>. (Year: 2014).*

(Continued)

*Primary Examiner* — Adam J Eiseman
*Assistant Examiner* — Matthew Stephens
(74) *Attorney, Agent, or Firm* — Donald J. Erasler (57) ABSTRACT

A conduit offset bender preferably includes an upper die, a lower die, a first guide plate, a second guide plate, a force transfer plate, two compression springs and an actuation device. The upper die includes an upper die base, a first pair of lugs, a second pair of lugs, a first boss flange and a second boss flange. The lower die includes a lower die base, two first lower boss flanges and two second lower boss flanges. Larger and smaller offset grooves are formed in the upper and lower dies. The two compression springs are retained in spring counterbores formed in the upper and lower boss flanges. A bottom of the first and second guide plates are attached to the lower die base. The actuation device includes a first handle plate, a second handle plate, a pressure roller, a cam roller, a pivot pin and a retention pin.

18 Claims, 6 Drawing Sheets

(56) References Cited

U.S. PATENT DOCUMENTS

2004/0182127 A1* 9/2004 Simonian .............. B21D 9/08
  72/390.5
2011/0000273 A1* 1/2011 Latoria ................ B21D 7/06
  72/459

OTHER PUBLICATIONS

1811 Little Kicker Hand Bender Instruction Manual. Datasheet [online]. Greenlee Textron Inc., 1996 [retrieved on Apr. 15, 2021]. Retrieved from the Internet. <URL: https://cdn.greenlee.com/resources/media?key=c207eb2c-7be8-45ac-bcc4-dd89143c3900&languageCode=en&type=document>. (Year: 1996).*
½" EMT Hand Bender as disclosed at www.greenlee.com/us/1-2-emt-hand-bender-1810.

* cited by examiner

CONDUIT OFFSET BENDER

BACKGROUND OF THE INVENTION

1. Field of the Invention

The present invention relates generally to bending tools and more specifically to a conduit offset bender, which allows two different conduit diameters to be bent with a single tool.

2. Discussion of the Prior Art

A Greenlee model 1810 offset bender includes bending for only one size of conduit.

Accordingly, there is a clearly felt need in the art for a conduit offset bender, which accommodates two different sizes of conduit for offset bending by upper and lower reversing dies.

SUMMARY OF THE INVENTION

The present invention provides a conduit offset bender, which allows two different conduit diameters to be bent with a single tool. The conduit offset bender preferably includes an upper die, a lower die, a first guide plate, a second guide plate, a force transfer plate, two compression springs and an actuation device. The upper die includes an upper die base, a first pair of lugs, a second pair of lugs, a first upper boss flange and a second upper boss flange. The first pair of lugs extend outward from a first side of the upper die base. The second pair of lugs extend outward from a second side of the upper die base. The first upper boss flange extends outward from the upper die base at the first side and a first end thereof. The second upper boss flange extends outward from the upper die base at the second side and a second end thereof. An upper spring counterbore and a lower spring counterbore are formed in the first and second upper boss flanges to receive one end of the two compression springs. A larger upper offset groove is formed in a top of the upper die base and a smaller upper offset groove is formed in a bottom of the die base. The larger and smaller upper offset grooves are sized to receive two different conduit diameters.

The lower die includes a lower die base, two first lower boss flanges and two second lower boss flanges. The two first lower boss flanges extend outward from a first side of the lower die base at two first corners thereof. The two second lower boss flanges extend outward from a second side of the lower die base at two second corners thereof. An upper spring counterbore is formed in one of the two first lower boss flanges and in one of the two second lower boss flanges to receive an opposing end of the two compression springs. A lower spring counterbore is formed in the other one of the two first lower boss flanges and in the other one of the two second lower boss flanges to receive the opposing end of the two compression springs.

A larger lower offset groove is formed in a top of the lower die base and a smaller lower offset groove is formed in a bottom of the die base. The larger and smaller offset grooves are sized to receive two different conduit diameters. The two compression springs are retained in either the two upper spring counterbores or the two lower spring counterbores. The first and second guide plates each include two lower fastener holes and an upper pivot hole. A pair of guide plate holes are formed through the lower die base. The first and second guide plates are preferably attached to the first and second sides of the lower guide base with two quick release pins. A distance between the first pair of lugs is sized to receive the first guide plate and a distance between the second pair of lugs is sized to receive the second guide plate.

The actuation device includes a first handle plate, a second handle plate, a pressure roller, a cam roller, a pivot pin and a retention pin. The pressure roller includes a cam hole, which is sized to receive an outer diameter of the cam roller. The cam roller includes a pivot hole and a retention hole, located above the pivot hole. A handle pivot hole is formed through the first and second handle plates. A handle retention hole is formed through the first and second handle plates, above the pivot hole. The actuation device is assembled by inserting the cam roller into the cam hole. The pivot pin is pressed through the handle pivot holes in the first and second handle plates, and inserted through the pivot hole in the cam roller. The retention pin is pressed into the handle retention holes in the first and second handle plates, and inserted through the retention hole in the cam roller. The pivot pin extending from opposing sides of the actuation device is pivotally retained in the upper pivot holes in the upper first and second guide plates. The force transfer plate includes a first slot formed in a first side and a second slot formed in a second side thereof. The first slot is sized to receive the first guide plate and the second slot is sized to receive the second guide plate. An end of a leverage handle is secured between the first and second handle plates with welding, fasteners or any other suitable device or process. The force transfer plate is sized to apply force to a top of the first and second lugs, when the pressure roller is applying force to the transfer plate.

In use, changing from the size of conduit to be bent requires removal of two quick release pins to remove the first and second guide plates. The upper and lower dies are rotated 180 degrees about a widthwise axis. The two springs are inserted into the two upper spring counterbores in the upper die and the two lower spring counterbores in the lower die. The first and second guide plates are reattached to the lower die with the two quick release pins. A length of the two springs ensure that a distance between a top of the upper offset groove and a bottom of the lower offset groove is greater than a diameter of the tube being bent.

Accordingly, it is an object of the present invention to provide a conduit offset bender, which accommodates two different sizes of conduit for offset bending by reversing two dies.

These and additional objects, advantages, features and benefits of the present invention will become apparent from the following specification.

DETAILED DESCRIPTION OF THE PREFERRED EMBODIMENTS

Figure 1:
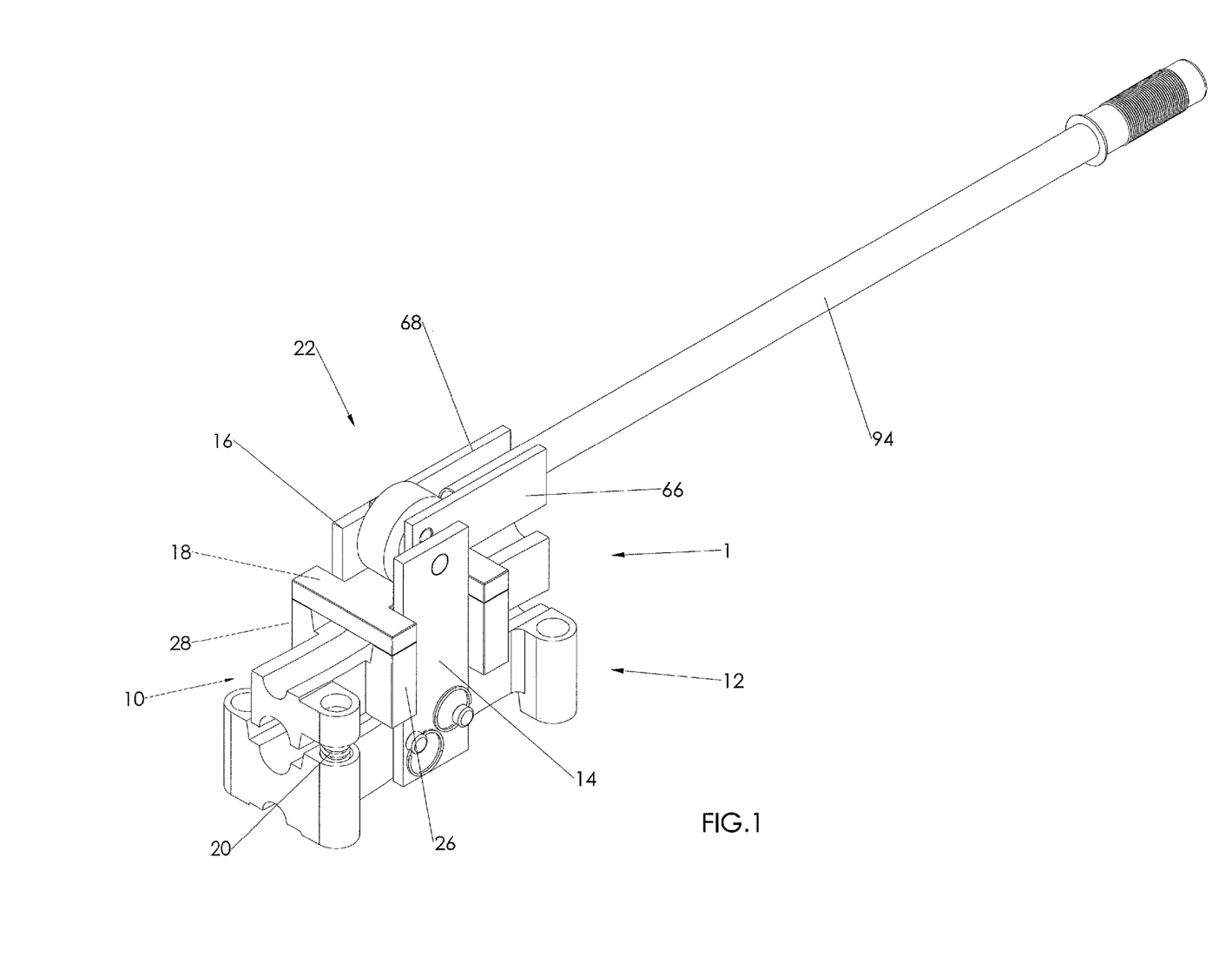
FIG. 1 is a perspective view of a conduit offset bender in accordance with the present invention.
Figure 2:
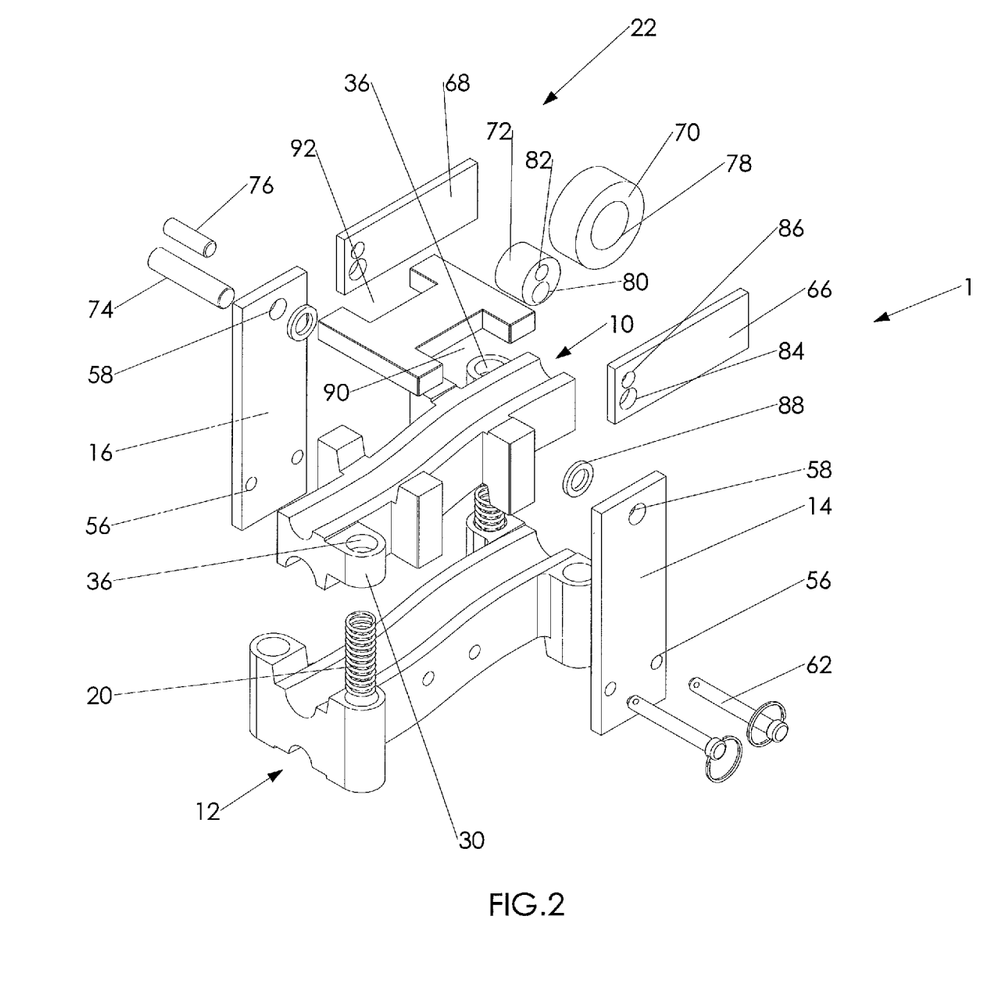
FIG. 2 is an exploded perspective view of a conduit offset bender without a handle in accordance with the present invention.
Figure 3:
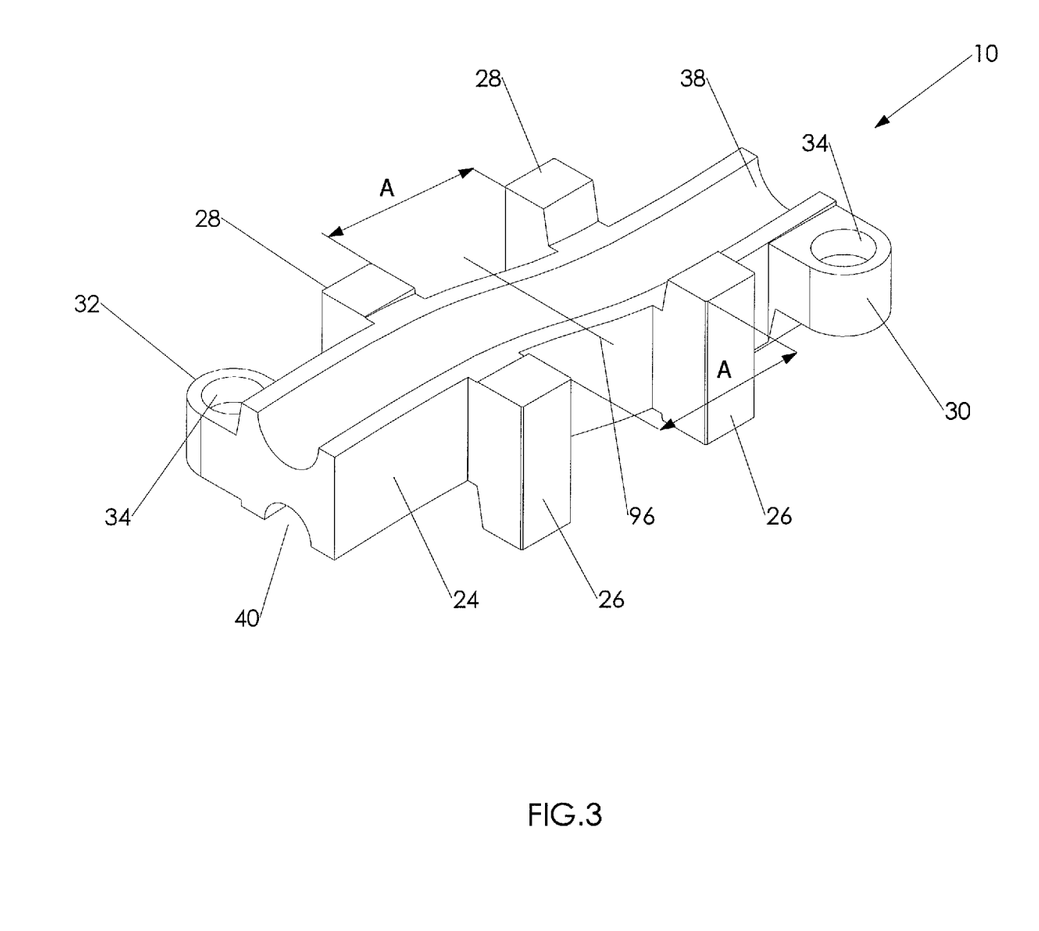
FIG. 3 is a perspective view of an upper die with a larger upper offset conduit groove facing-up of a conduit offset bender in accordance with the present invention.

With reference now to the drawings, and particularly to FIG. 1, there is shown a conduit offset bender 1. With reference to FIGS. 2-6, the conduit offset bender 1 preferably includes an upper die 10, a lower die 12, a first guide plate 14, a second guide plate 16, a force transfer plate 18, two compression springs 20 and an actuation device 22. With reference to FIG. 3, the upper die 10 includes an upper die base 24, a first pair of lugs 26, a second pair of lugs 28, a first boss flange 30 and a second boss flange 32. The first pair of lugs 26 extend outward from a first side of the upper die base 24. The second pair of lugs 28 extend outward from a second side of the upper die base 28. The first boss flange 30 extends outward from the upper die base 24 at the first side and a first end thereof. The second boss flange 32 extends outward from the upper die base 24 at the second side and a second end thereof. A top spring counterbore 34 and a bottom spring counterbore 36 are formed in the first and second boss flanges 30, 32 to receive one end of the two springs 20. A larger upper offset groove 38 is formed in a top of the upper die base 24 and a smaller upper offset groove 40 is formed in a bottom of the die base 24. The larger upper offset groove 38 and the smaller upper offset groove 40 are sized to receive two different conduit diameters.

Figure 4:
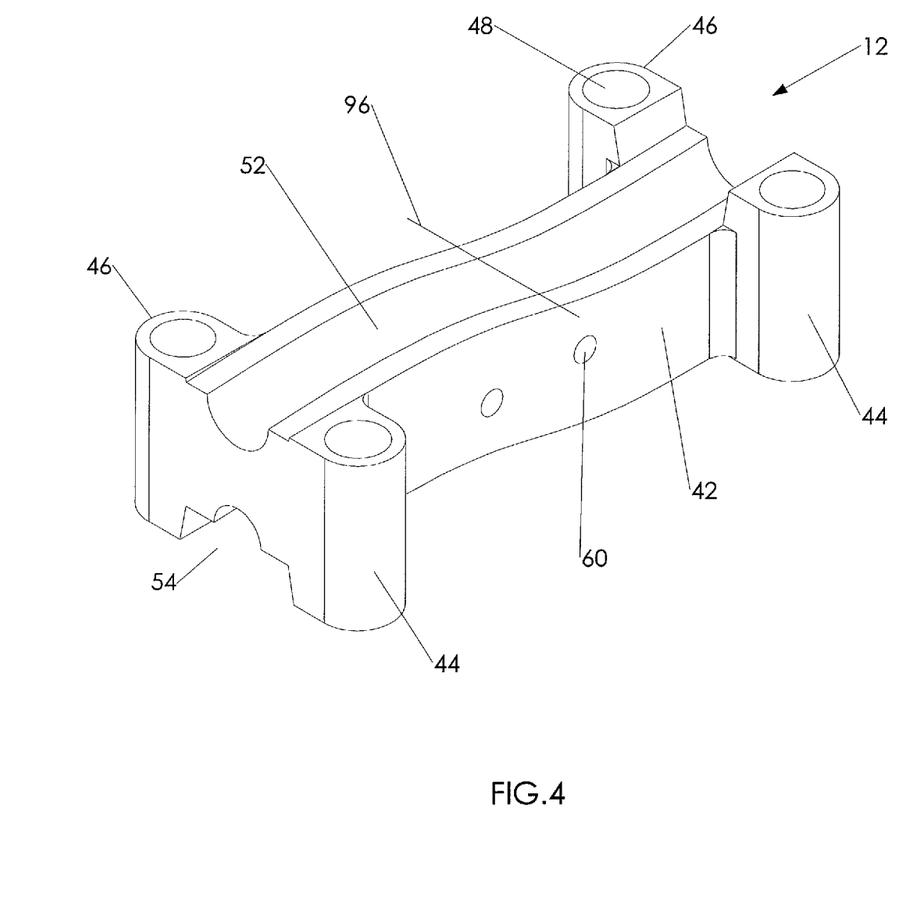
FIG. 4 is a perspective view of a lower die with a larger lower offset groove facing-up of a conduit offset bender in accordance with the present invention.
Figure 5:
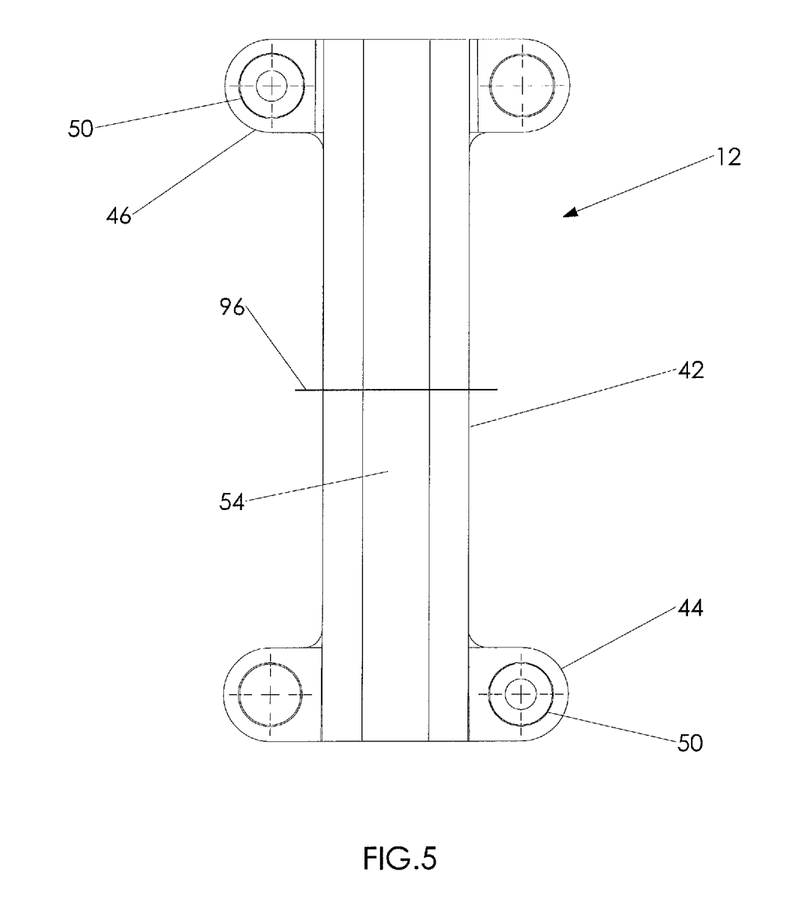
FIG. 5 is a bottom view of a lower die with a smaller lower offset groove facing-up of a conduit offset bender in accordance with the present invention.
Figure 6:
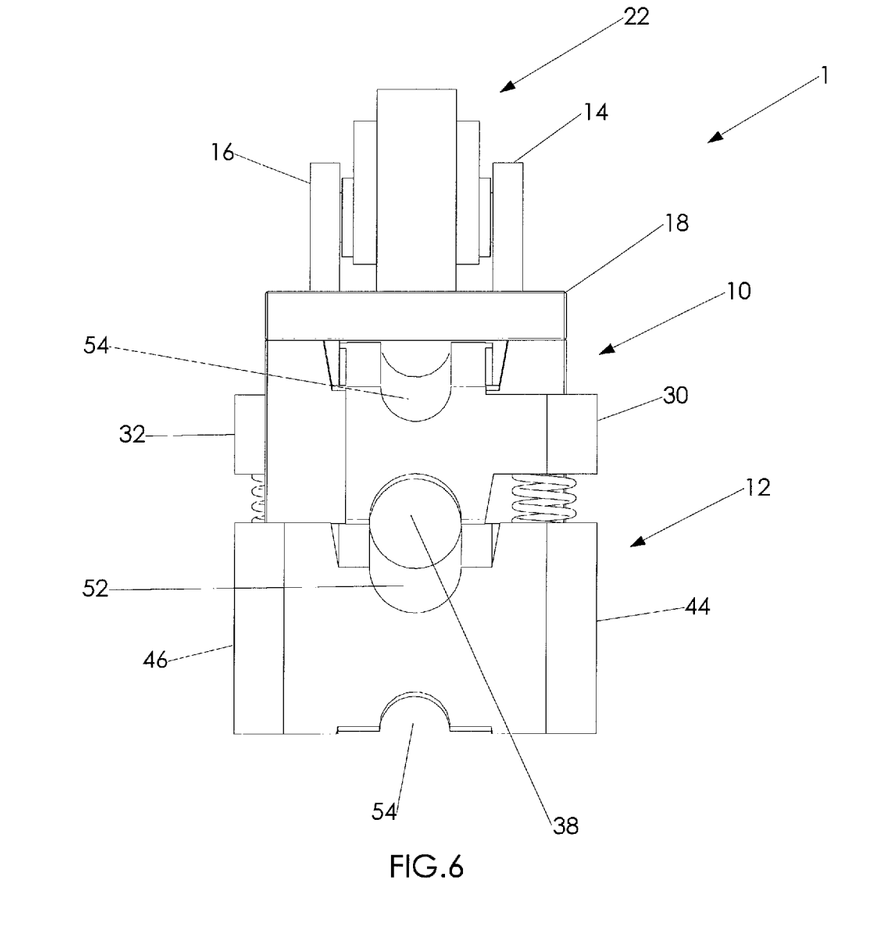
FIG. 6 is an end view of a conduit offset bender in accordance with the present invention.

With reference to FIG. 4, the lower die 12 includes a lower die base 42, two first lower boss flanges 44 and two second lower boss flanges 46. The two first lower boss flanges 44 extend outward from a first side of the lower die base 42 at two first corners thereof. The two second lower boss flanges 44 extend outward from a second side of the lower die base 42 at two second corners thereof. A top spring counterbore 48 is formed in one of the two first lower boss flanges 44 and in one of the two second lower boss flanges 46 to receive an opposing end of the two compression springs 20. A bottom spring counterbore 50 is formed in the other one of the two first lower boss flanges 44 and in the other one of the two second lower boss flanges 46 to receive an opposing end of the two compression springs 20.

A larger lower offset groove 52 is formed in a top of the lower die base 42 and a smaller lower offset groove 54 is formed in a bottom of the die base 42. The larger lower offset groove 52 and the smaller lower offset groove 54 are sized to receive two different conduit diameters. With reference to FIG. 2, the two springs 20 are retained in either the two upper spring counterbores 48 or the two lower spring counterbores 50. The first and second guide plates 14, 16 each include two lower fastener holes 56 and an upper pivot hole 58. A pair of guide plate holes 60 are formed through the lower die base 42. The first and second guide plates 14, 16 are preferably attached to the first and second sides of the lower guide base 42 with two quick release pins 62. However, the two quick release pins 62 may be replaced with any other suitable fasteners.

A distance "A" between the first pair of lugs 26 is sized to receive the first guide plate 14 and a distance "A" between the second pair of lugs 28 is sized to receive the second guide plate 16.

The actuation device 22 includes a first handle plate 66, a second handle plate 68, a pressure roller 70, a cam roller 72, a pivot pin 74 and a retention pin 76. The pressure roller 70 includes a cam hole 78, which is sized to receive an outer diameter of the cam roller 72. The cam roller 72 includes a pivot hole 80 and a retention hole 82 located above the pivot hole 80. A handle pivot hole 84 is formed through the first and second handle plates 66, 68. A handle retention hole 86 is formed through the first and second handle plates 66, 68. The actuation device 22 is assembled by inserting the cam roller 72 into the cam hole 78. Two spacer washers 88 are positioned on opposing sides of the cam roller 72. The pivot pin 74 is pressed into the handle pivot holes 84 in the first and second handle plates 66, 68, and inserted into the two spacer washers 88 and the pivot hole 80 in the cam roller 70.

The retention pin 76 is pressed into the handle retention holes 86 in the first and second handle plates 66, 68, and inserted into the retention hole 82 in the cam roller. The pivot pin 74 extending from opposing sides of the actuation device 22 is pivotally retained in the upper pivot holes 58 in the first and second guide plates 14, 16. The force transfer plate 18 includes a first slot 90 formed in a first side and a second slot 92 formed in a second side thereof. The first slot 90 is sized to receive the first guide plate 14 and the second slot 92 is sized to receive the second guide plate 16. With reference to FIGS. 1-2, an end of a leverage handle 94 is secured between the first and second handle plates 66, 68 with welding, fasteners or any other suitable device or method. The force transfer plate 18 is sized to apply force to a top of the first and second lugs 26, 28, when the pressure roller 70 is applying force to the transfer plate 18.

In use, changing from the larger size of conduit to be bent to a smaller size of conduit requires removing the two quick release pins 62 from the first and second guide plates 14, 16. The upper and lower dies 10, 12 are rotated 180 degrees about a widthwise axis 96. The two compression springs 20 are inserted into the two bottom spring counterbores 36 in the upper die 10 and the two bottom spring counterbores 50 in the lower die 12. The first and second guide plates 14, 16 are reattached to the lower die 12 with the two quick release pins 62. A length of the two compression springs 20 ensure that a distance between a top of the upper offset groove 38, 40 and a bottom of the lower offset groove 52, 54 is greater than a diameter of the conduit being bent, or a gap between the upper die 10 and the lower die 12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A conduit offset bender comprising:

an upper die includes an upper die base, a larger upper offset groove is formed in a top of said upper die base and a smaller upper offset groove is formed in a bottom of said upper die base, at least one first lug extends from a first side of said upper die base, at least one second lug extend from a second side of said upper die base;

a lower die includes a lower die base, a larger lower offset groove is formed in a top of said lower die base and a smaller lower offset groove is formed in a bottom of said lower die base;

a force transfer plate is configured to make contact with substantially all of a top of said at least one first and second lugs;

a first guide plate is selectively detachable from a first side of said lower die base, said upper die is guided by said first guide plate;

a second guide plate is selectively detachable from a second side of said lower die base, said lower die is guided by said second guide plate; and an actuation device includes a first handle plate, a second handle plate and a pressure roller, said pressure roller is eccentrically retained between said first and second handle plates, said first and second handle plates are pivotally retained by said first and second guide plates, wherein said pressure roller applies force to said transfer force plate when pivoted.

2. The conduit offset bender of claim 1 wherein:
said upper die includes a first upper boss flange and a second upper boss flange, said first boss flange extends outward from said upper die base at a first side and a first end thereof, said second boss flange extends outward from said upper die base at a second side and a second end thereof.

3. The conduit offset bender of claim 2 wherein:
said lower die includes two first lower boss flanges and two second lower boss flanges, said two first two lower boss flanges extend from a first side of lower die base, said two second lower boss flanges extend from a second side of said lower die base.

4. The conduit offset bender of claim 3 wherein:
two compression springs each having one end retained in one of said first upper boss flange and said second upper boss flange, an opposing end of each of said two compression springs is retained in one of said two first lower boss flanges or said two second lower boss flanges.

5. The conduit offset bender of claim 1 wherein:
said actuation device further includes a first handle plate, a second handle plate, a pressure roller, a cam roller and a pivot pin, said cam roller is retained in said pressure roller, said first and second handle plates are placed on opposing sides of said pressure roller, said pivot pin is configured to be pressed through said first and second handle plates, said pivot pin is positioned through said first and second guide plates and said cam roller.

6. The conduit offset bender of claim 1, further comprising:
a handle is retained between said first and second handle plates.

7. A conduit offset bender comprising:
an upper die includes an upper die base, a larger upper offset groove is formed in a top of said upper die base and a smaller upper offset groove is formed in a bottom of said upper die base, a first pair of lugs extend from a first side of said upper die base, a second pair of lugs extend from a second side of said upper die base;

a lower die includes a lower die base, a larger lower offset groove is formed in a top of said lower die base and a smaller lower offset groove is formed in a bottom of said lower die base, said lower die is biased away from said upper die;

a force transfer plate is configured to make contact with substantially all of a top of said pair of first and second lugs;

a first guide plate is selectively detachable from a first side of said lower die base, said upper die is guided by said first guide plate;

a second guide plate is selectively detachable from a second side of said lower die base, said lower die is guided by said second guide plate; and an actuation device includes a first handle plate, a second handle plate and a pressure roller, said pressure roller is eccentrically retained between said first and second handle plates, said first and second handle plates are pivotally retained between said first and second guide plates, wherein said pressure roller applies force to said force transfer plate when pivoted.

8. The conduit offset bender of claim 7 wherein:
a first gap between said first pair of lugs is sized to receive said first guide plate, a second gap between said second pair of lugs is sized to receive said second guide plate.

9. The conduit offset bender of claim 7 wherein:
said upper die includes a first upper boss flange and a second upper boss flange, said first boss flange extends outward from said upper die base at a first side and a first end thereof, said second boss flange extends outward from said upper die base at a second side and a second end thereof.

10. The conduit offset bender of claim 9 wherein:
said lower die includes two first lower boss flanges and two second lower boss flanges, said two first two lower boss flanges extend from a first side of lower die base, said two second lower boss flanges extend from a second side of said lower die base.

11. The conduit offset bender of claim 10 wherein:
two compression springs each having one end retained in one of said first upper boss flange and said second upper boss flange, an opposing end of each of said two compression springs is retained in one of said two first lower boss flanges or said two second lower boss flanges to bias said upper die away from said lower die.

12. The conduit offset bender of claim 7 wherein:
said actuation device further includes a first handle plate, a second handle plate, a pressure roller, a cam roller and a pivot pin, said cam roller is retained in said pressure roller, said first and second handle plates are placed on opposing sides of said pressure roller, said pivot pin is configured to be pressed through said first and second handle plates, said pivot pin is positioned through said first and second guide plates and said cam roller.

13. The conduit offset bender of claim 7, further comprising:
a handle is retained between said first and second handle plates.

14. A conduit offset bender comprising:
an upper die includes an upper die base, a larger upper offset groove is formed in a top of said upper die base and a smaller upper offset groove is formed in a bottom of said upper die base, at least one first lug extends from a first side of said upper die base, at least one second lug extend from a second side of said upper die base;

a lower die includes a lower die base, a larger lower offset groove is formed in a top of said lower die base and a smaller lower offset groove is formed in a bottom of said lower die base;

a first guide plate selectively detachable from a first side of said lower die base, said upper die is guided by said first guide plate;

a second guide plate selectively detachable from a second side of said lower die base, said lower die is guided by said second guide plate;

a force transfer plate is configured to make contact with a top of said pair of first and second lugs, said force transfer plate includes a first slot and a second slot which are sized to receive said first and second guide plates; and an actuation device includes a first handle plate, a second handle plate and a pressure roller, said pressure roller is eccentrically retained between said first and second handle plates, said first and second handle plates are pivotally retained between said first and second guide plates, wherein said pressure roller applies force to said force transfer plate when said actuation device is pivoted.

15. The conduit offset bender of claim 14 wherein:
a first gap between said first pair of lugs is sized to receive said first guide plate, a second gap between said second pair of lugs is sized to receive said second guide plate.

16. The conduit offset bender of claim 14 wherein:
said upper die includes a first upper boss flange and a second upper boss flange, said first boss flange extends outward from said upper die base at a first side and a first end thereof, said second boss flange extends outward from said upper die base at a second side and a second end thereof.

17. The conduit offset bender of claim 16 wherein:
said lower die includes two first lower boss flanges and two second lower boss flanges, said two first two lower boss flanges extend from a first side of lower die base, said two second lower boss flanges extend from a second side of said lower die base.

18. The conduit offset bender of claim 17 wherein:
two compression springs each having one end retained in one of said first upper boss flange and said second upper boss flange, an opposing end of each of said two compression springs is retained in one of said two first lower boss flanges or said two second lower boss.

\* \* \* \* \*